United States Patent
Nonaka

(10) Patent No.: US 9,530,165 B2
(45) Date of Patent: Dec. 27, 2016

(54) FINANCIAL TRANSACTION SYSTEM

(75) Inventor: Nobuyuki Nonaka, Chiba (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 688 days.

(21) Appl. No.: 12/664,591

(22) PCT Filed: Jun. 12, 2008

(86) PCT No.: PCT/JP2008/060761
§ 371 (c)(1),
(2), (4) Date: Jan. 26, 2010

(87) PCT Pub. No.: WO2008/153096
PCT Pub. Date: Dec. 18, 2008

(65) Prior Publication Data
US 2010/0191626 A1    Jul. 29, 2010

(30) Foreign Application Priority Data
Jun. 12, 2007  (JP) ................................. 2007-154941

(51) Int. Cl.
*G07B 17/00*     (2006.01)
*G06F 21/00*     (2013.01)
(Continued)

(52) U.S. Cl.
CPC .............. *G06Q 40/04* (2013.01); *G06Q 40/12* (2013.12)

(58) Field of Classification Search
USPC ......................................................... 705/30
See application file for complete search history.

(56) References Cited

U.S. PATENT DOCUMENTS

2004/0039701 A1*  2/2004  Nakamura ............. G06Q 20/04
                                                            705/42
2004/0117262 A1*  6/2004  Berger .................. G06Q 20/00
                                                            705/16
(Continued)

FOREIGN PATENT DOCUMENTS

JP      2003 30450      1/2003
JP      2004 227183     8/2004
(Continued)

*Primary Examiner* — Ashford S Hayles
(74) *Attorney, Agent, or Firm* — Lex IP Meister, PLLC

(57) ABSTRACT

A financial transaction system includes: an ATM process substituting server connected to a backbone server that executes a user accounting process through a communication mechanism capable of concealing content of communication; and a transaction screen WEB server connected to the ATM process substituting server and capable of connecting to a user communication terminal. The transaction screen WEB server transmits, to the communication terminal, transaction screen data for the user to input transaction necessary information, receives, from the communication terminal, transaction necessary information data inputted in accordance with the transaction screen data, and transmits the transaction necessary information data to the ATM process substituting server. The ATM process substituting server transmits the transaction necessary information data to the backbone server and transmits a message requesting the user for a specified transaction process. The system provides quick, easy transactions without needing to input a second personal identification number or one time password.

1 Claim, 6 Drawing Sheets

(51) Int. Cl.
*G06Q 40/04* (2012.01)
*G06Q 40/00* (2012.01)

(56) References Cited

U.S. PATENT DOCUMENTS

| 2007/0125840 A1* | 6/2007 | Law | G06Q 20/10 |
| | | | 235/379 |
| 2008/0123843 A1* | 5/2008 | MacHani | H04L 9/0822 |
| | | | 380/44 |

FOREIGN PATENT DOCUMENTS

| JP | 2006 53846 | 2/2006 |
| WO | 2007 018119 | 2/2007 |

* cited by examiner

FINANCIAL TRANSACTION SYSTEM

TECHNICAL FIELD

The present invention relates to a financial transaction system, and more specifically, to a financial transaction system without the need to use a second personal identification number.

BACKGROUND ART

Conventionally, various financial services, such as procedures of deposit, withdrawal, and transfer from financial accounts such as back accounts, provided by financial institutions, money lenders, and cash handling companies are often carried out by an ATM (Automated Teller Machine) that is a machine capable of carrying out a transaction by an operation of the customer. Furthermore, the construction and development of the communication infrastructure allows using a PC (Personal Computer) or a cellular phone to use financial services provided by the financial institutions, money lenders, and cash handling companies through a network.

The transactions carried out through the network are not face-to-face transactions. Therefore, the transactions are significantly different from conventional physical transactions such as face-to-face transactions, and the transaction partners cannot be directly determined. Moreover, compared to the personal computer communication that is a closed network implementing a membership system and the like, the transactions through the Internet utilize an open network. In such a transaction, due to the characteristics of the open network such as: (1) unspecified number of persons can easily access the network through terminal apparatuses such as PCs and cellular phones; (2) transmission data passes through various computers; and (3) there is no entity managing the entire network, risks such as: (1) eavesdropping of data, (2) falsification, (3) denial of transmission and reception by concerned parties of transaction, and (4) "impersonation" by third parties, are expected to rise. Data to be transmitted and received may include not only information indicating the content of transaction, but also personal information of customer, such as address, phone number, and credit card number, and "electronic value" that replaces money depending on the settlement system. Therefore, the transaction is naturally prone to be targeted for counterfeiting and exploitation, and ensuring the security is significantly important.

Thus, various mechanisms of security measures are developed and created in which sophisticated encryption techniques (encryption technique will be described in chapter 8) are utilized. First of all, there is a method of ensuring the security by encrypting the data to be transmitted. The use of the method allows a countermeasure against the risk of (1), or "concealing" the data from third parties. However, this is insufficient, and means for checking the completeness of the transmitted data is required to deal with the risk of (2). This will be called "certification" of data. Checking whether the communication partner is really the transaction partner is necessary to prevent the risks of (3) and (4), or so-called "playing dumb" in which the transaction partner of the destination of transmission of the electronic value "denies receiving" the electronic value, or conversely, denies that "I didn't place such an order" in response to the request of payment according to the received content of order, or to prevent "impersonation" by a malicious third party who steals a password of others to order a product without consent, or conversely, who pretends to be a company to receive the product fee. This is an act of "certifying" the customer and plays a significantly important role in the electronic transactions.

Financial services can be used regardless of time or place using the PC and the cellular phone. However, it is more important to take measures to prevent fraudulent acts, such as a malicious third party withdrawing or transferring from the user account.

Conventionally, there is a method of using a password as one of the measures to prevent the fraudulent acts to the user account. This is one of the certification techniques for verifying whether a person making an access is a qualified user when a server computer is used through a network from a terminal in a remote place (remote access).

In a conventional normal certification method of transmitting a password corresponding to the user name, there is a problem that the password may be "eavesdropped" on a communication path from the terminal to the server. Thus, a technique of using a second personal identification number or a one time password (OTP) is proposed. In the one time password, the server first transmits a random character string (called "challenge"), serving as the "type" of certification character string, to the server.

The user inputs a secret password that only the user knows to the terminal. Software included in the terminal calculates the challenge character string transmitted from the server and the password inputted by the user in accordance with a certain procedure and transmits the generated result (called "response") to the server.

The server verifies the received character string and checks whether the user is a qualified user.

The challenge is designed to be a different character string every time, and the password declared by the user is transmitted to the server as a different character string every time.

Therefore, even if the communication between the server and the terminal is eavesdropped on the communication path, the same password cannot be used twice, and the server is not fraudulently used. Examples of software realizing the one time password include free software S/KEY and OPIE as well as SecurID of Security Dynamics.

DISCLOSURE OF THE INVENTION

Problems to be Solved by the Invention

However, when the second personal identification number or the one time password is used, the user needs to refer to an encryption card or a code generator acquired in advance to acquire the second personal identification number or the one time password and further needs to input the second personal identification number or the one time password from a PC or a communication terminal, which is inconvenient in carrying out a quick or easy transaction.

An object of the present invention is to provide a transaction technique capable of preventing fraudulent acts, such as a malicious third party withdrawing or transferring from the user account, even if a personal identification number is fraudulently acquired and capable of carrying out quick and easy transactions without the need to input a second personal identification number or a one time password.

Means for Solving the Problems

The present invention has the following features as means for solving the problems.

The present invention is provided as a financial transaction system. The financial transaction system is characterized by comprising: a first server (for example, ATM process substituting server) connected to a backbone server that executes an accounting process of a user account through communication means capable of concealing the content of communication; and a second server (for example, transaction screen WEB server) connected to the first server and capable of connecting to a communication terminal used by the user, wherein the second server transmits, to the communication terminal, transaction screen data for the user to input transaction necessary information, receives, from the communication terminal, transaction necessary information data inputted in accordance with the transaction screen data, and transmits the transaction necessary information data to the first server, and the first server transmits the transaction necessary information data to the backbone server and transmits a message requesting the user for a specified transaction process.

According to the financial transaction system, the user can use a cellular phone of the user as an ATM (Automatic Teller Machine) to quickly and easily carry out transactions.

Furthermore, since the backbone server and the first server are connected by communication means, such as a VPN (Virtual Private Network), that can guarantee the concealment of communication, problems, such as leakage of personal identification number, can also be prevented.

In the financial transaction system, the transaction necessary information data may include only one personal identification number, and the transaction necessary information data may not include a second personal identification number or a one time password.

According to such a financial transaction system, the user can carry out a financial transaction by inputting only one type of personal identification number. Therefore, more quick and easy transactions can be carried out.

In the financial transaction system, the transaction necessary information data may be characterized by including terminal identification information. According to the financial transaction system, fraudulent acts, such as impersonation by unauthorized third parties, can be prevented, and more quick and easy transactions can be carried out.

Advantages of the Invention

According to the present invention, transactions capable of carrying out quick and easy transactions can be realized.

According to another aspect of the present invention, transactions capable of carrying out quick and easy transactions can be realized without using a second personal identification number or a one time password.

BEST MODE FOR CARRYING OUT THE INVENTION

Hereinafter, an embodiment of the present invention will be described with reference to the drawings.

FIG. 1 is a block diagram showing a schematic configuration of a financial transaction system according to the present embodiment. Here, the "financial transaction system" in the present specification is a system for carrying out a transaction (such as deposit, withdrawal, and transfer) using a predetermined account by use of a communication terminal.

A financial transaction system 1 includes a transaction screen WEB server 20 and an ATM process substituting server 30.

A communication terminal 10 used by the user can communicate with the transaction screen WEB server 20 through a base station (BS) 50, a mobile communication network 60, a gateway 70, and a network 80. The transaction screen WEB server 20 and the ATM process substituting server 30 are connected through a communication line or a communication network and can communicate each other. The ATM process substituting server 30 can communicate with a backbone server 40 of a financial institution that handles the user account.

[1.1. Communication Terminal]

The communication terminal 10 is a terminal apparatus capable of communicating with the transaction screen WEB server 20 and is, for example, a cellular phone or a personal computer having a network communication function. In the present embodiment, although the communication terminal 10 is described as a cellular phone, the communication terminal of the present invention is not limited to the cellular phone.

[1.2. Transaction Screen WEB Server]

The transaction screen WEB server 20 is an apparatus including a central processing unit (CPU), a main memory (RAM), a read only memory (ROM), an I/O device (I/O), and an external storage device such as a hard disk device as required. The transaction screen WEB server 20 is, for example, an information processing apparatus such as a computer or a workstation. The ROM or the hard disk device or the like stores a program allowing the information processing apparatus to function as the transaction screen WEB server 10 or a program allowing an electronic settlement method to be executed by a computer. The program is placed on the main memory and executed by the CPU to implement the transaction screen WEB server 20. Furthermore, the program need not necessarily be stored in the storage device in the information processing apparatus. The program may be provided by an external apparatus (for example, a server such as an ASP (Application Service Provider)) and placed on the main memory. Moreover, the transaction screen WEB server 20 may be composed of a single apparatus or a plurality of apparatuses coupled together via a network. The transaction screen WEB server 20 may be configured as a center into which all functions are integrated or as distributed servers obtained by division according to functions so as to enable a distributed process.

The transaction screen WEB server 20 has functions of transmitting an input interface for inputting information necessary for transaction, such as account number and personal identification number, to the communication terminal 10 through the network in response to a request from the communication terminal 10, receiving data indicating information necessary for transaction (hereinafter, called "necessary information data") from the communication terminal 10 through the network, and transmitting and transferring the necessary information data to the ATM process substituting server 30. In the embodiment, the transaction screen WEB server 20 transmits a WEB document (such as HTML file) as an input interface to the communication terminal 10 by HTTP and transfers necessary information data, which is parameters of an HTTP request message returned by a communication terminal, to the ATM process substituting server 30.

It is preferable that third parties cannot eavesdrop the communication means for connecting the transaction screen WEB server 20 and the ATM process substituting server 30. Examples of the communication means include a LAN, a dedicated line, and a VPN not connected to an open network.

[1.3. ATM Process Substituting Server]

The ATM process substituting server 30 is an apparatus including a central processing unit (CPU), a main memory (RAM), a read only memory (ROM), an I/O device (I/O), and an external storage device such as a hard disk device as required. The ATM process substituting server 30 is, for example, an information processing apparatus such as a computer or a workstation. The ROM or the hard disk device or the like stores a program allowing the information processing apparatus to function as the transaction screen WEB server 10 or a program allowing an electronic settlement method to be executed by a computer. The program is placed on the main memory and executed by the CPU to implement the ATM process substituting server 30. Furthermore, the program need not necessarily be stored in the storage device in the information processing apparatus. The program may be provided by an external apparatus (for example, a server such as an ASP (Application Service Provider)) and placed on the main memory. Moreover, the ATM process substituting server 30 may be composed of a single apparatus or a plurality of apparatuses coupled together via a network. The ATM process substituting server 30 may be configured as a center into which all functions are integrated or as distributed servers obtained by division according to functions so as to enable a distributed process.

The ATM process substituting server 30 is a server that can execute the same processes as a so-called ATM (Automated Teller Machine) except the handling of cash, and specifically, is a server having functions for executing the following processes.

(1) Repayment of loan by cash,
(2) Reference to savings balance, transaction statement, market information, and the like,
(3) Deposit, and
(4) Transfer (transaction of withdrawing from one of the user's savings accounts and depositing into another savings account).

The ATM process substituting server 30 acquires a request (for example, transfer request) transmitted from the communication terminal 10 through the transaction screen WEB server 20 and requests the backbone server 40 to execute a process according to the request. The ATM process substituting server 30 also acquires the result of the process executed by the backbone server 40 and transmits the result to the communication terminal 30 through the transaction screen WEB server 20.

[1.4. Backbone Server]

The backbone server 40 is a server that handles an account system of a financial institution and is a server or a server group that handles an account processing function, such as depositing and saving, and that handles a backbone system for the financial institution. Communication means 90 that can conceal information connects the backbone server 40 and the ATM process substituting server 30 so that two-way communication is possible. Examples of the communication means for connecting the servers 40 and 30 each other include a dedicated communication line and a VPN (Virtual Private Network).

[1.5. Network, Etc.]

Regardless of whether the network 80 is a wired or wireless network or uses a dedicated or switched line, the network 80 operates to enable information transmission between apparatuses connected to the network 80 when each of the apparatuses establishes a session with the target apparatus. The network 80 may be implemented by combining a plurality of networks via gateways as in the Internet. Furthermore, the connections may be temporary ones like PPP connections instead of direct connections to a so-called backbone, as long as information can be transmitted between the apparatuses when a session is established. The "communication network" may be a communication network without path switching means, such as switching equipment, a switch, or a router, which has fixedly distributed dedicated lines.

In the configuration example of the financial transaction system 1 shown in FIG. 1, it is assumed that a cellular phone is used as the communication terminal 10. Therefore, FIG. 1 illustrates that the cellular phone as the communication terminal 10 first connects to the base station 50 through a wireless line and connects to the network 80, to which the transaction screen WEB server 20 is connected, from the base station 50 through the mobile communication network 60 and the gateway 70. However, if the communication terminal 10 can directly connect to the network 80, the communication terminal 10 may connect to the electronic settlement server without passing through the mobile communication network 70 and the gateway 80. For example, if the mobile communication terminal 10 has a wireless LAN connection function, communication through the mobile communication network 60 and the gateway 70 is not required. For example, if the communication terminal 10 is a personal computer having a wireless LAN connection function, the present invention can also be implemented by a configuration in which the communication terminal 10 makes a connection by accessing a hotspot (wireless LAN terminal) connected to the network 80.

The gateway 70 is an apparatus that connects the mobile communication network 60 and the network 80 and is an apparatus that mainly converts the protocol between the networks.

[2. Example of Operation of Financial Transaction System]

Next, an example of operation of the financial transaction system 1 will be described with reference to FIGS. 2 and 3. FIGS. 2 and 3 are sequence diagrams showing an example of operation of the financial transaction system 1.

It is assumed that the user of the financial transaction system 1 uses the present system to carry out a transaction (example herein is a transfer from an account of the user to a service providing company). The user first transmits a transaction screen transmission request message from the communication terminal 10 to the transaction screen WEB server 20 (S101).

When the transaction screen transmission request message is received, the transaction screen WEB server 20 transmits transaction screen data, which is a WEB document functioning as an input interface, to the communication terminal 10 (S102). The communication terminal 10 that has received the transaction screen data displays a transaction screen on display means (for example, liquid crystal display apparatus) of the communication terminal 10 based on the transaction screen data.

FIG. 4 shows an example of the transaction screen displayed on the communication terminal 10. The transaction screen shown in FIG. 4 is the first screen displayed after the communication terminal 10 started communicating with the transaction screen WEB server 20.

Display means 400 of the communication terminal 10 displays a transaction screen 401 configured as shown in FIG. 4. On the transaction screen 401, an account number input box 402 for inputting a user account number, a personal identification number input box 403 for inputting a personal identification number set to the account with the account number, a transmission button 404, and a cancel button 405 are created.

The user uses keys of the communication terminal 10 to input the account number and the personal identification number in the account number input box 402 and the personal identification number input box 403. Subsequently, when the user activates a transmission button 404 by pressing an enter key or clicking a pointing device, the communication terminal 10, or more specifically, an application for carrying out the transaction, transmits transaction necessary information data, such as the inputted account number and the personal identification number, to the transaction screen WEB server 202 (S104). The transaction necessary information data includes information (for example, transaction ID) for identifying the content of transaction when processing is requested to the ATM process substituting server 30. For example, the content of processing, such as user authentication, transfer, and deposit, can be notified to the ATM process substituting server 30 by the transaction ID.

In the embodiment, information for identifying a bank corresponding to the user account (for example, bank code) and information for identifying a branch office (for example, branch office code) are stored in advance in the communication terminal 10, and the communication terminal 10 transmits the account number and the personal identification number inputted from the transaction screen 401 as well as the information for identifying the bank (for example, bank code) and the information for identifying the branch office (for example, branch office code) to the transaction screen WEB server 20 as the transaction necessary information data. It is obvious that the present invention can also be implemented as an embodiment in which the information for identifying the bank (for example, bank code) and the information for identifying the branch office (for example, branch office code) are placed on the transaction screen shown in FIG. 4 for the user to input.

At this point, along with the transaction necessary information data such as the account number and the personal identification number, the terminal apparatus 10 transmits information that can uniquely identify the communication terminal 10 (hereinafter, called "terminal identification information") to the transaction screen WEB server 20. Information that can be used as the terminal identification information includes, for example, the following. a) A password or the like issued when a contract for the mobile terminal is signed with a financial institution having the user account, b) A serial number (user ID) written to the mobile communication terminal at the same time when the user downloads an application such as an i appli ("i appli": NTTDoCoMo, Inc.'s registered trademark; an application downloaded into a cellular phone to allow a value-added function to be added and not particularly limiting an OS; hereinafter referred to as "i appli") from the electronic settlement server, c) The manufacture number of the mobile communication terminal 10, d) The serial number of an SIM (Subscriber Identity Module Card), e) The telephone number of the mobile communication terminal 10, f) A common ID for the standards typified by OpenID, and g) A method satisfying one or more of the results of a logical calculation or encryption of the pieces of information a) to f) and information describing the date and the amount.

The "OpenID" is a standard for the common ID, is in a URL format, and can be commonly utilized in OpenID-compatible sites (see http://openid.net/).

Next, the transaction screen WEB server 20 transfers the transaction necessary information data received from the communication terminal 10 to the ATM process substituting server 30 (S105). The ATM process substituting server 30 that has received the transaction necessary information data determines what process to execute based on the transaction ID included in the transaction necessary information data and executes the determined content of processing (S106). In this example, the ATM process substituting server 30 performs user authentication.

To perform the user authentication, the ATM process substituting server 30 identifies a backbone server 40 to be inquired based on the bank code included in the transaction necessary information data, transmits the branch office code, the account number, and the personal identification number included in the transaction necessary information data to the backbone server 40, and requests for the comparison with the record of the backbone server 40 (S107). The backbone server 40 verifies whether the branch office codes, the account numbers, and the personal identification numbers match and transmits the verification result to the ATM process substituting server 30 (S107). Since the backbone server 40 and the ATM substitution processing server 30 are connected by the communication means 90 that can conceal the communication, there is no fear of malicious third parties fraudulently acquiring the account number and the personal identification number.

After the verification result is notified from the backbone server 40, the ATM process substituting server 30 transmits a message for instructing a screen transmission process corresponding to the verification result to the transaction screen WEB server 20 (S108). For example, if the verification result of the backbone server 40 indicates that the branch codes, the account numbers, and the personal identification numbers match, the ATM process substituting server 30 transmits an instruction to the transaction screen WEB server 20 to transmit the following screen for the transaction to the communication terminal 10. On the other hand, if the account number and the personal identification number do not match, the ATM process substituting server 30 transmits an instruction to the transaction screen WEB server 20 for transmitting, to the communication terminal 10, a screen for notifying the user that the account number and the personal identification number are not correct.

The transaction screen WEB server 20 that has received the message transmitted in S108 transmits, to the communication terminal 10, transaction screen data (WEB document) constituting a transaction screen corresponding to the message (S109).

When the transaction screen data (WEB document) is received from the transaction screen WEB server 20, the communication terminal 10 displays the input interface or the transaction screen on display means (for example, liquid crystal display apparatus) of the communication terminal 10 based on the transaction screen data and prompts the user to perform an input to continue carrying out the transaction. The user performs the input in accordance with the input interface displayed on the display means (S110).

FIG. 5 shows an example of a transaction screen displayed in the communication terminal 10, indicating a transaction screen after transition from the transition screen shown in FIG. 4.

The display means 400 of the communication terminal 10 displays the transaction screen 401 configured as shown in FIG. 5, following the screen of FIG. 4. It is assumed herein that the content of transaction requested to the ATM process substituting server 30 indicates that the user is requesting the financial transaction system 1 to transfer a specified transfer amount from the user account to a specified destination account.

On the transaction screen 401 shown in FIG. 5, a destination bank input box 502 for inputting bank name/bank code of the destination account, a head and branch office code input box 503 for inputting head or branch office name/head or branch office code of the destination account, a destination account number input box 504 for inputting an account number of the destination account, a transfer amount input box 505 for inputting a transfer amount, a transmission button 506, and a cancel button 507 are created.

The user uses keys and the like of the communication terminal 10 to input the bank name/bank code, the head or branch office name/head or branch office code, and the transfer amount to the corresponding input boxes (S110).

Subsequently, when the user activates the transmission button 506 by pressing an enter key or clicking a pointing device, the communication terminal 10, or more specifically, an application for carrying out the transaction, transmits transaction necessary information data constituted by the inputted bank name/bank code, the head or branch office name/head or branch office code, the transfer amount, the terminal identification information, and the like to the transaction screen WEB server 20 (FIG. 3, S111).

Next, the transaction screen WEB server 20 transfers the transaction necessary information data received from the communication terminal 10 to the ATM process substituting server 30 (S112). The ATM process substituting server 30 that has received the transaction necessary information data determines what process to execute based on the transaction ID included in the transaction necessary information data and executes the determined content of processing (S113). In this example, the ATM process substituting server 30 is requested for the transfer process and executes the transfer process.

To execute the requested transaction process ("transfer process" as an example herein), the ATM process substituting server 30 performs user authentication based on the terminal identification information. If the user authentication is successful, the ATM process substituting server 30 identifies a backbone server 40 to be requested for transfer based on the bank code included in the transaction necessary information data, transmits, to the backbone server 40, the branch office code, the account number, the personal identification number, the destination bank name/bank code, the head or branch office name/head or branch office code, and the transfer amount included in the transaction necessary information data, and requests the backbone server 40 for the transfer process (S114).

The backbone server 40 verifies whether the branch office code, the account number, and the personal identification number match the stored ones, and if they are correct, executes a transfer process (accounting process) in accordance with the requested content (S115). The backbone server 40 also transmits the processing result to the ATM process substituting server 30 (S114). Since the backbone server 40 and the ATM substitution processing server 30 are connected by the communication means 90 that can conceal the communication, there is no fear of malicious third parties fraudulently acquiring the account number and the personal identification number.

After the processing result is notified from the backbone server 40, the ATM process substituting server 30 transmits a message for instructing a screen transmission process corresponding to the processing result to the transaction screen WEB server 20 (S116).

The transaction screen WEB server 20 that has received the message transmitted in S116 transmits, to the communication terminal 10, transaction screen data (WEB document) constituting a transaction screen corresponding to the message (S117).

After receiving the transaction screen data (WEB document) from the transaction screen WEB server 20, the communication terminal 10 displays the transaction screen on displays means (for example, liquid crystal display apparatus) of the communication terminal 10 based on the transaction screen data.

FIG. 6 shows an example of a transaction screen displayed on the communication terminal 10, indicating a transaction screen (processing result notification screen) after transition from the second transaction screen shown in FIG. 5.

The display means 400 of the communication terminal 10 displays the transaction screen 401 configured as shown in FIG. 6, following the screen of FIG. 5. The screen displays information indicating that the transfer amount specified from the account of the user is transferred to the destination account specified by the user as a result of the transaction requested to the ATM process substituting server 30. This allows the user to check that the requested transaction is normally completed.

DESCRIPTION OF SYMBOLS

Figure 1:
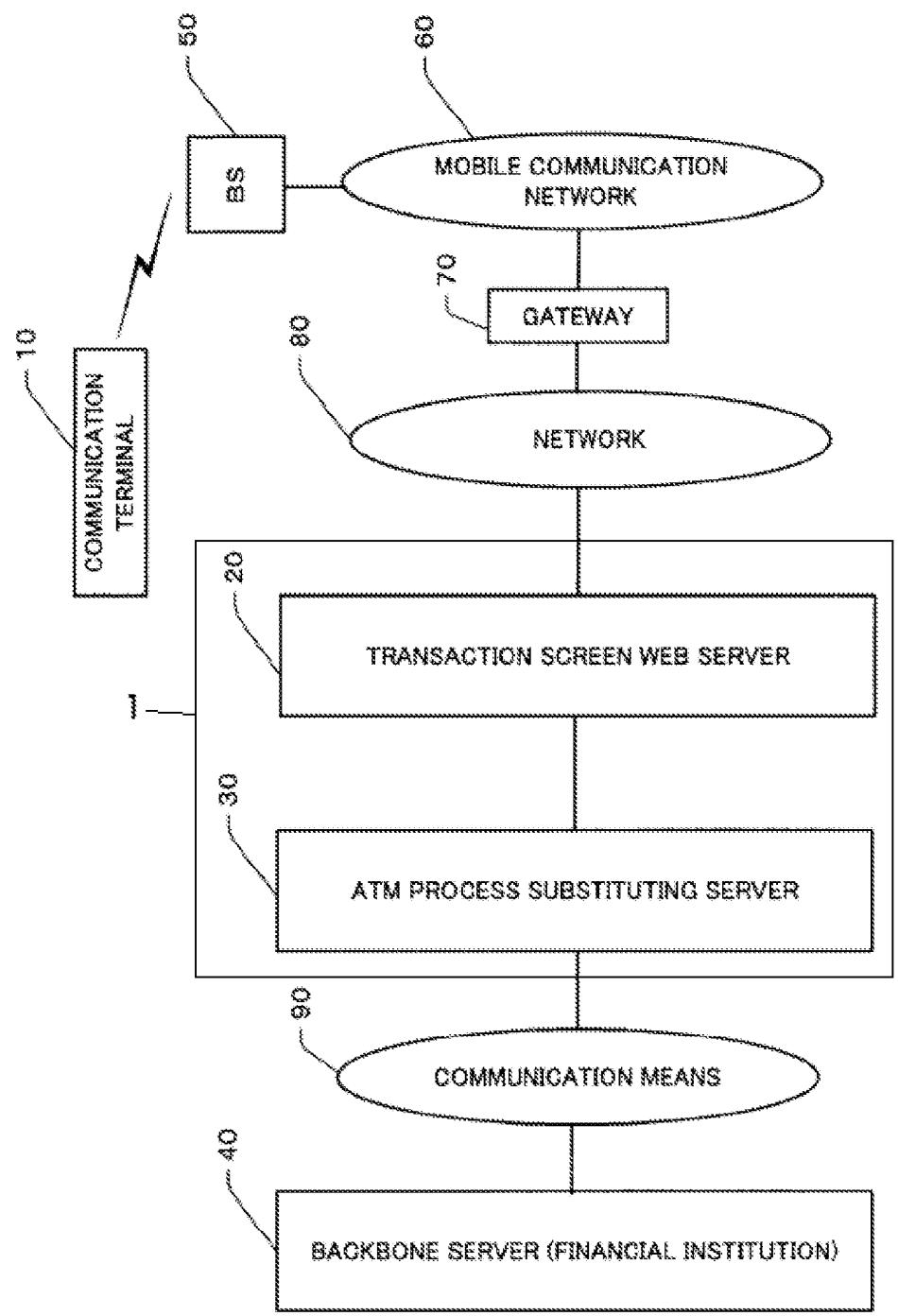
FIG. 1 is a block diagram showing an example of configuration of a financial transaction system according to the present invention.
Figure 2:
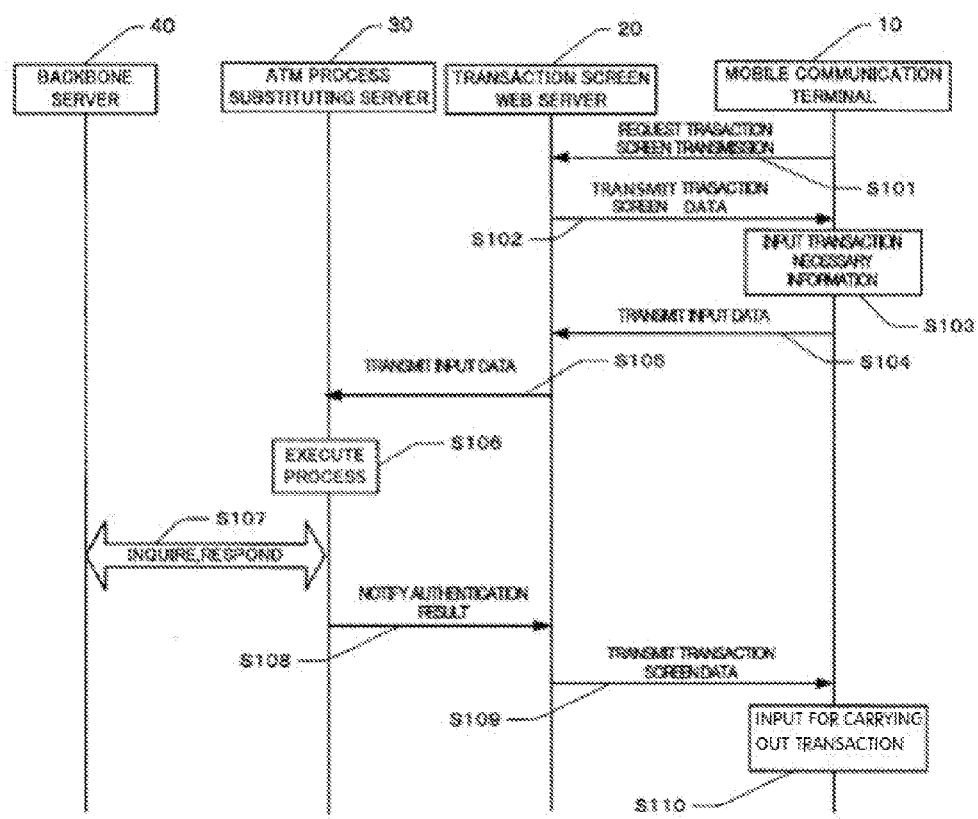
FIG. 2 is a sequence diagram showing an example of operation of the financial transaction system according to the present invention.
Figure 3:
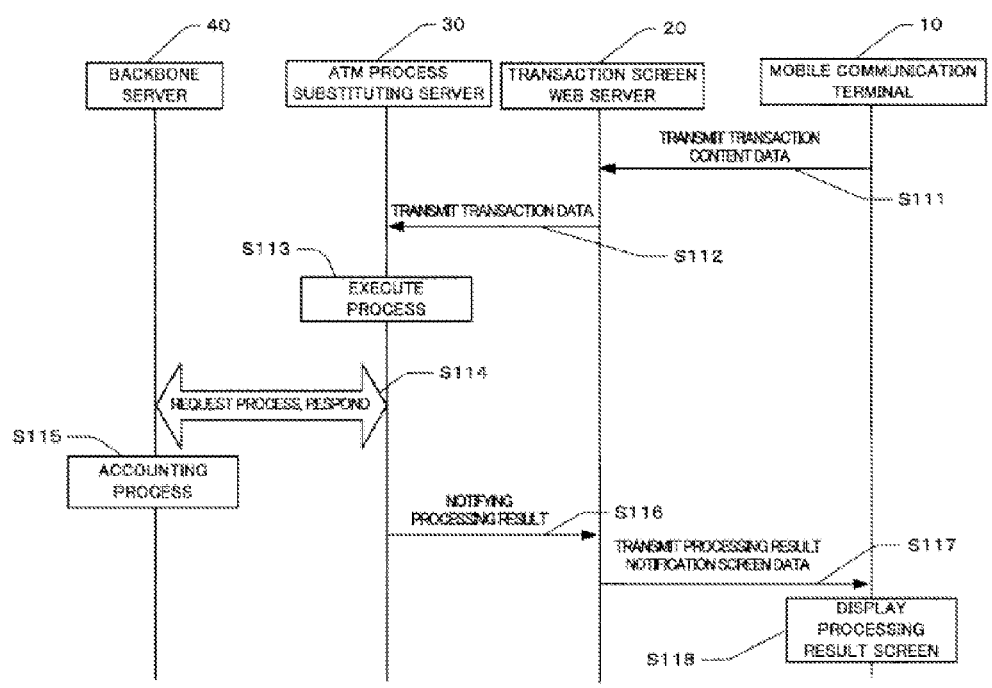
FIG. 3 is a sequence diagram, following FIG. 2, showing an example of operation of the financial transaction system according to the present invention.
Figure 4:
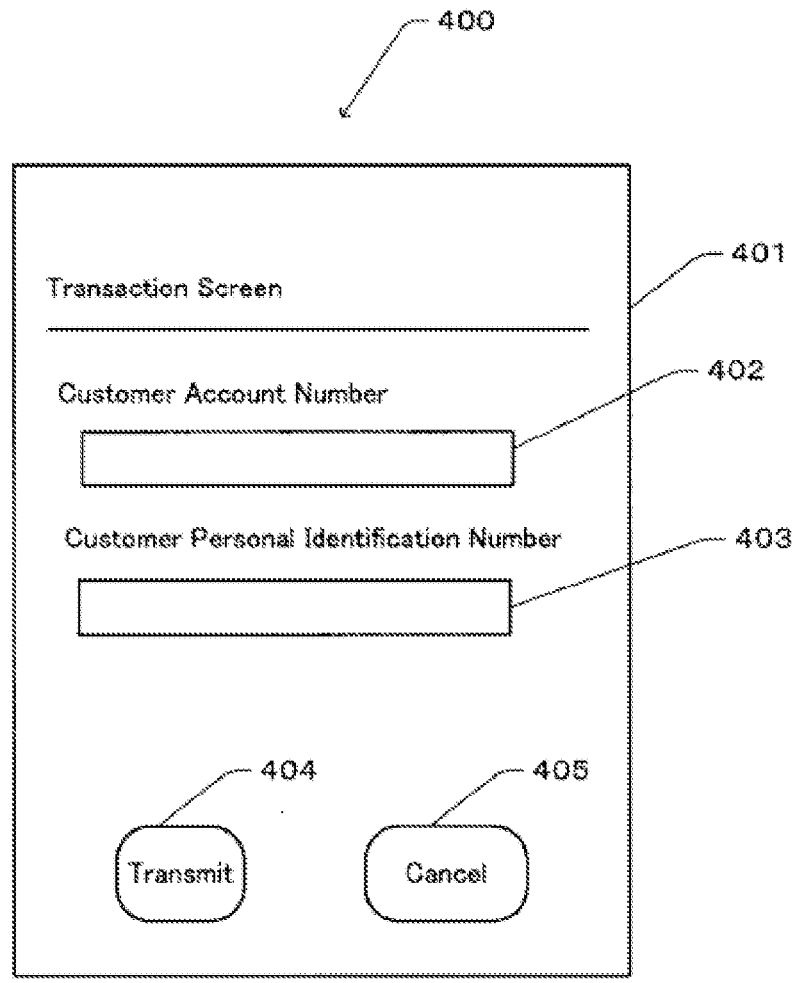
FIG. 4 is a diagram showing an example of a transaction screen of a communication terminal.
Figure 5:
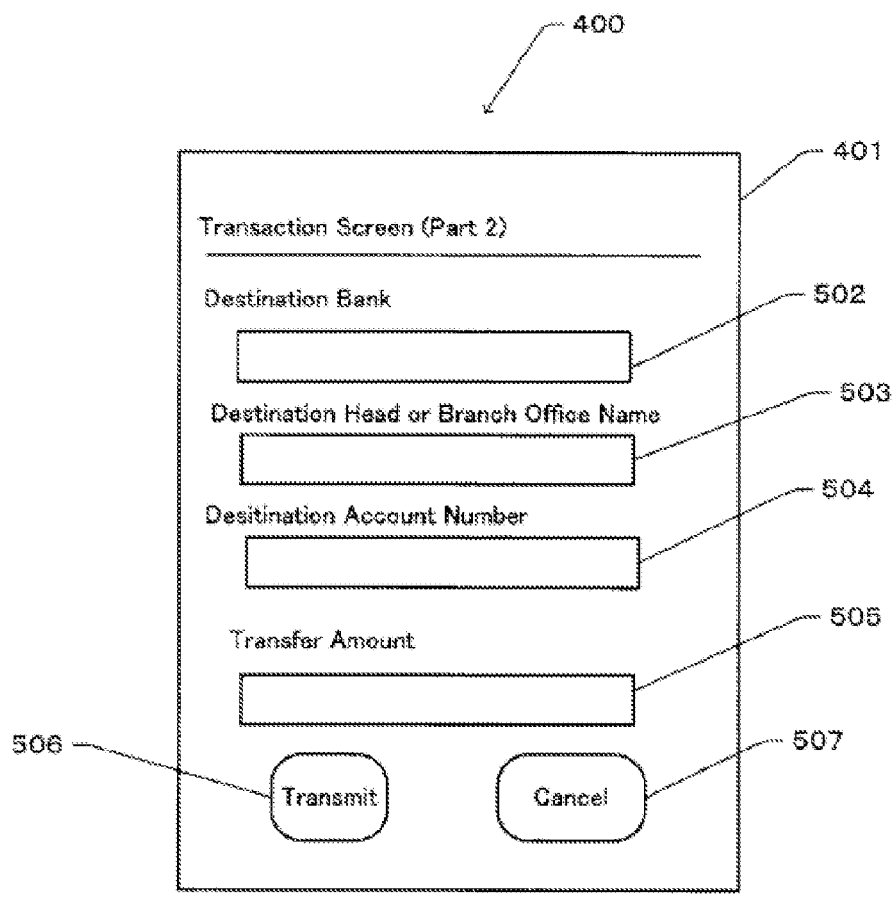
FIG. 5 is a diagram showing an example of a transaction screen of the communication terminal displayed after transition from the screen of FIG. 4.
Figure 6:
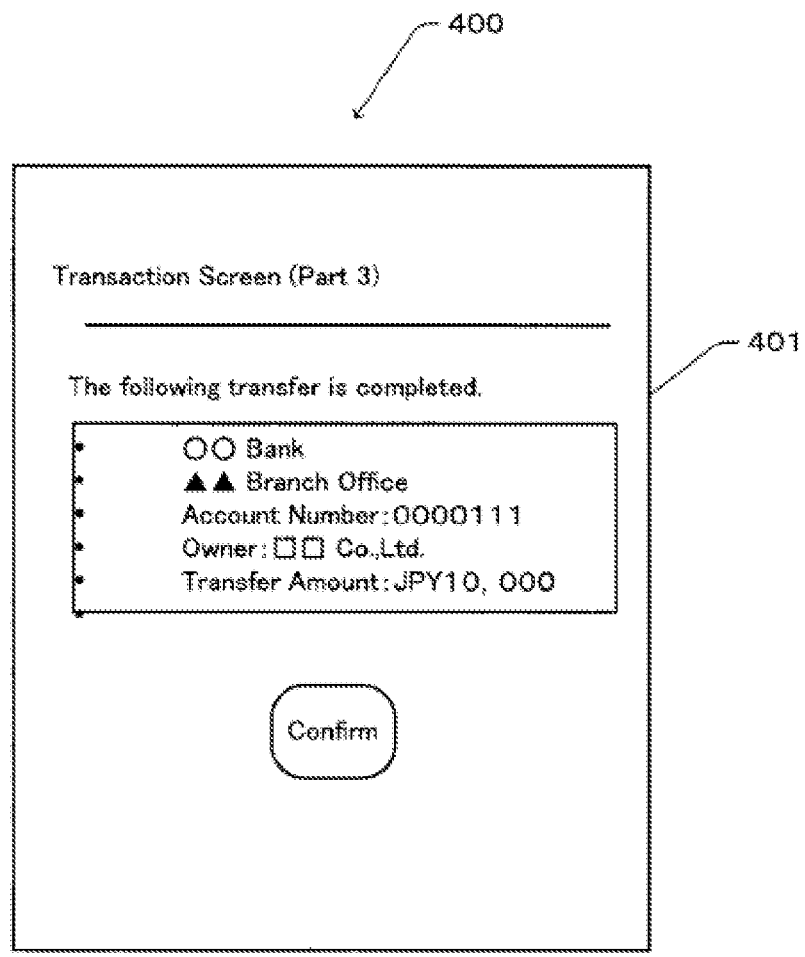
FIG. 6 is a diagram showing an example of a transaction screen of the communication terminal displayed after transition from the screen of FIG. 5.

1 financial transaction system
10 communication terminal
20 transaction screen WEB server
30 ATM process substituting server
40 backbone server

The invention claimed is:
1. A financial transaction system comprising:
 a backbone server configured to execute a financial transaction of a user account;
 a first server which is physically separated from the backbone server and connected to the backbone server through communication means capable of concealing content of communication; and
 a second server connected to the first server through communication means including at least one of a LAN, a dedicated line, and a VPN,
 wherein:
 the second server is configured to:
 connect to a communication terminal used by a user;
 transmit, to the communication terminal, transaction screen data for entry of transaction necessary data including account number and only one personal identification number (PIN) and no one-time password by the user;

receive, from the communication terminal, the transaction necessary data including account number and PIN only entered by the user in accordance with the transaction screen data;

receive, from the communication terminal, terminal identification information that uniquely identifies the communication terminal generated automatically without any user intervention; and transmit the received transaction necessary data including account number and PIN only to the first server; and the first server is configured to:

transmit at least a portion of the transaction necessary data including account number and PIN to the backbone server;

transmit a request for a first authentication of the user to the backbone server based on the at least a portion of the transaction necessary data including account number and PIN transmitted to the backbone server;

receive an affirmative result of for the first authentication from the backbone server;

transmit an instruction to the second server, in accordance with the affirmative result of the first authentication, to transmit a screen for a desired transaction;

receive data from the communication terminal necessary for the desired transaction through the second server;

receive data for a second authentication including the terminal identification information from the second server in accordance with the affirmative result of the first authentication; and perform the second authentication of the user based on the terminal identification information for the desired transaction, wherein the second authentication of the user is performed by comparing the terminal identification information received from the communication terminal through the second server with the terminal identification information stored in the financial transaction system, wherein the backbone server asks to perform the transaction at the backbone server after second authentication;

wherein the transaction comprises one of transfer, withdrawal or deposit.

\* \* \* \* \*